United States Patent
Wu et al.

(10) Patent No.: US 6,305,227 B1
(45) Date of Patent: Oct. 23, 2001

(54) SENSING SYSTEMS USING QUARTZ SENSORS AND FIBER OPTICS

(75) Inventors: Jian-Qun Wu, Houston, TX (US); Kevin F. Didden, Wallingford; Alan D. Kersey, S. Glastonbury, both of CT (US); Phillip E. Pruett, Bakersfield, CA (US); Arthur D. Hay, Cheshire, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/145,621

(22) Filed: Sep. 2, 1998

(51) Int. Cl.$^7$ .................................................. G01L 9/00
(52) U.S. Cl. ..................................................... 73/705
(58) Field of Search ............................... 73/705, 152.51, 73/152.52, 152.53; 250/227.14, 227.24; 356/345; 350/96.1

(56) References Cited

U.S. PATENT DOCUMENTS

| | | |
|---|---|---|
| 2,301,326 | 11/1942 | Reistle, Jr. . |
| 2,824,378 | 2/1958 | Stokes . |

(List continued on next page.)

FOREIGN PATENT DOCUMENTS

| | | |
|---|---|---|
| 0434030 | 6/1991 | (EP) . |
| 9938048 | 7/1999 | (WO) . |

* cited by examiner

Primary Examiner—William Oen

(74) Attorney, Agent, or Firm—Ware, Fressola, Van Der Sluys & Adolphson LLP

(57) ABSTRACT

A quartz sensing system includes a quartz sensor, an electromechanical converter, an optical source, an optical fiber and a signal processor. The quartz sensor responds to a pressure, and further responds to an electrical power signal, for providing a quartz sensor electrical signal containing information about the pressure. The electromechanical converter responds to the quartz sensor signal, for providing an electromechanical converter force containing information about the sensed voltage or current signal. The optical source for provides an optical source signal. The optical fiber responds to the electromechanical converter force, for changing an optical parameter or characteristic of the optical source signal depending on the change in length of the optical fiber and providing an electromechanical converter optical signal containing information about the electromechanical converter force. The signal processor responds to the electromechanical converter optical signal, for providing a signal processor signal containing information about the pressure. In one embodiment, the electromechanical converter includes a piezoelectric or magnetostrictive transducer that responds to the quartz sensor signal, for providing an piezoelectric or magnetostrictive transducer force containing information about the quartz sensor signal. In another embodiment, the electromechanical converter includes an acoustic transducer and a piezoelectric or magnetostrictive transducer. The acoustic transducer responds to the quartz sensor signal, for providing an acoustic transducer wave containing information about the quartz sensor signal. The piezoelectric or magnetostrictive transducer responds to the acoustic transducer wave, for providing a piezoelectric or magnetostrictive transducer force containing information about the acoustic transducer wave.

25 Claims, 6 Drawing Sheets

U.S. PATENT DOCUMENTS

| | | |
|---|---|---|
| 2,894,200 | 7/1959 | Szasz . |
| 3,086,167 | 4/1963 | Chaney et al. . |
| 4,162,400 | 7/1979 | Pitts, Jr. . |
| 4,167,111 | 9/1979 | Spuck, III . |
| 4,226,288 | 10/1980 | Collins, Jr. . |
| 4,389,645 | 6/1983 | Wharton . |
| 4,390,974 | 6/1983 | Siems ................................... 367/76 |
| 4,442,842 | 4/1984 | Baba . |
| 4,455,869 | 6/1984 | Broussard et al. . |
| 4,594,691 | 6/1986 | Kimball et al. . |
| 4,610,006 | 9/1986 | MacDonald . |
| 4,681,395 * | 7/1987 | Lindsay et al. .................. 350/96.16 |
| 4,700,803 | 10/1987 | Mallett et al. . |
| 4,703,460 | 10/1987 | Kurkjian et al. . |
| 4,829,486 | 5/1989 | Broding ................................ 367/25 |
| 4,852,067 | 7/1989 | White . |
| 4,950,883 | 8/1990 | Glenn . |
| 4,951,267 | 8/1990 | Chang et al. . |
| 4,951,677 | 8/1990 | Crowley et al. . |
| 4,996,419 | 2/1991 | Morey . |
| 5,007,705 | 4/1991 | Morey et al. . |
| 5,039,221 * | 8/1991 | Layton et al. ....................... 356/345 |
| 5,097,838 | 3/1992 | Hirooka et al. . |
| 5,396,166 * | 3/1995 | Vohra ............................. 250/227.14 |
| 5,467,212 | 11/1995 | Huber . |
| 5,495,547 | 2/1996 | Rafie et al. . |
| 5,497,233 * | 3/1996 | Meyer ................................. 356/345 |
| 5,510,582 | 4/1996 | Birchak et al. . |
| 5,623,455 | 4/1997 | Norris . |
| 5,626,192 | 5/1997 | Connell et al. . |
| 5,637,865 * | 6/1997 | Bullat et al. .................... 250/227.14 |
| 5,675,674 | 10/1997 | Weis . |
| 5,731,550 | 3/1998 | Lester et al. . |
| 5,737,278 | 4/1998 | Frederick et al. . |
| 5,804,713 | 9/1998 | Kluth . |
| 5,808,779 | 9/1998 | Weis . |
| 5,848,204 * | 12/1998 | Wanser .................................. 385/12 |
| 5,877,426 * | 3/1999 | Hay et al. .............................. 73/733 |
| 5,986,749 * | 11/1999 | Wu et al. ........................... 356/73.1 |

SENSING SYSTEMS USING QUARTZ SENSORS AND FIBER OPTICS

BACKGROUND OF INVENTION

1. Technical Field

The present invention relates to a distributed sensing system; and more particularly, to a distributed sensing system using quartz and optical fiber for sensing a physical property such as pressure in an borehole of an oil well.

2. Description of the Prior Art

A traditional pressure sensor using quartz crystals generates a RF signal whose frequency is proportional to the pressure applied on the pressure sensor. The frequency of the RF signal is measured and converted into a pressure measurement.

To compensate for the temperature effect on the measurement, the pressure sensor is typically made of two quartz structures that have resonance frequencies depending on the temperature and pressure. One of the quartz structures is insulated and is under a constant pressure. The other quartz structure is subject to the pressure at the sensor location. The two resonance signals are mixed. The RF signal whose frequency is a difference between the two resonating frequencies is the output. The difference in resonance frequencies is due to the pressure.

Such a pressure measurement is very accurate and is free of temperature effect. Because the quartz property is very stable over time, the sensor measurement does not drift with time. The quartz pressure sensor is very accurate and reliable for both dynamic and static pressure measurements.

Although the quartz pressure sensor is excellent in applications where a single point or a few point sensing is required, it is, however, very hard to build a distributed pressure sensing system using these pressure sensors. A RF telemetry system requires the capability of generating at a sensor location a carrier RF signal whose frequency does not change with pressure, temperature, and time. The cross talk is eliminated by using a carrier whose frequency is distinct. A digital approach would require attaching electronics to each sensor to digitize the frequency information and feed it into a digital telemetry bus.

Various distributed fiber optic pressure sensing systems have been used to measure acoustic or seismic signals. In particular, systems using fiber Bragg gratings (FBG) have been proposed to perform distributed acoustic sensing. The advantage of the FBG systems is that the sensors are part of the fiber that is also the telemetry system. Such sensing systems are simple, reliable, scalable, and inexpensive. Although good for sensing dynamic signals, simple FBG based systems do not produce reliable measurement of absolute static pressure free of temperature effect over time.

The present invention provides a solution to overcome these disadvantages in the prior art sensing systems.

SUMMARY OF THE INVENTION

The present invention provides a quartz sensing system includes a quartz sensor, an electromechanical converter, an optical source, an optical fiber and a measurement unit.

The quartz sensor responds to a physical property such as pressure in a borehole of an oil well, and further responds to an electrical power signal, for providing a quartz sensor electrical signal containing information about the physical property such as the pressure.

The electromechanical converter responds to the quartz sensor signal, for providing a mechanical force containing information about the sensed voltage or current signal.

In one embodiment, the electromechanical converter includes a piezoelectric or magnetostrictive transducer that responds to the quartz sensor signal, for providing an piezoelectric or magnetostrictive transducer force in the form of an expansion or contraction force containing information about the quartz sensor signal. The piezoelectric or magnetostrictive transducer converts electrical energy into mechanical energy, and vice versa.

In another embodiment, the electromechanical converter includes two acoustic tranmitters, one being connected to the quartz sensor and acting as an acoutic transmitter, and the other being an acoustic receiver. The acoustic transmitter responds to the quartz sensor signal, for providing an acoustic transmitter wave containing information about the quartz sensor signal. The acoustic receiver responds to the acoustic transmitter wave, for providing a receiver force containing information about the acoustic transmitter wave. In effect, the receiver converts acoustic energy into mechanical energy in the form of expansion and contraction.

The optical source provides an optical signal through the optical fiber. The optical signal may be a broadband or narrowband signal depending on whether a wavelength or time division multiplexing signal processing scheme is used.

The optical fiber responds to the electromechanical converter force, for changing an optical parameter or characteristic of the optical source signal depending on the change in length of the optical fiber and providing an electromechanically-converted optical signal containing information about the electromechanical converter force. In effect, the optical fiber converts electromechanical energy from the piezoelectric or magnetostrictive transducer into optical energy by changing a fundamental characteristic or parameter such as the phase or wavelength of the optical signal being transmitted or reflected through the optical fiber. The optical fiber is wrapped around the transducer and affixed thereon, including by bonding or wrapping under tension the optical fiber on the transducer. The optical fiber expands and contracts along with the transducer, which causes the change in the length of the optical fiber, which in turn causes the change in the phase or wavelength of the optical signal. The optical fiber may also have one or more fiber Bragg Gratings therein which change the phase of the optical signal depending on the change in length of the fiber Bragg Grating. Fiber Bragg Grating pairs may also be arranged on a part of the optical fiber not bonded to the transducer when a cavity approach is used with the transducer arranged between the fiber Bragg Grating pairs. In summary, the electrical voltage signal from the quartz sensor causes the transducer to stretch or contract the optical fiber and change in the length of the fiber, which in turn causes a change of the phase or wavelength in the optical signal being transmitted or reflected through the optical fiber.

The measurement unit responds to the electromechanical converter optical signal, for providing a measurement unit signal containing information about the physical property such as the pressure. The measurement unit converts the electromechanically-converted optical signal into the information about the physical property by detecting and processing the change in the optical parameter or characteristic such as the phase or wavelength of the optical signal.

The present invention provides important advantages over the sensing system of the prior art. The quartz sensor is a very stable sensing device. Moreover, since voltage measurements are effectively made at the sensing locations, the sensing system of the present invention does not suffer from the problem of signal attenuation. In operation, the electrical voltage signal is electro-optically converted into an optical phase or wavelength signal that is not adversely affected by amplitude attenuation as long as the amplitude of the light reaching the measurement unit is above some minimum value. Therefore, the voltage signal is effectively digitized at the sensor location without practically any quantization error. The optical detector system of the measurement unit and the property of the piezoelectric or magnetostrictive transducer determine the accuracy of the voltage measurement. Another advantage of the present invention is that there is no need for using sensitive electronics subject in hazardous conditions such as high temperature or pressure in a borehole of an oil well.

The present invention, therefore, can be used in many sensing applications.

The invention will be fully understood when reference is made to the following detailed description taken in conjunction with an accompanying drawing.

DETAILED DESCRIPTION OF THE INVENTION

Summary of the Present Invention

The distributed pressure sensing system of the present invention uses quartz sensors in combination with optical fiber. The sensing system may be effectively used as a optical fiber-based telemetry system, where sensed data is transmitted to a remote signal processing location away from the sensed area which may be subjected to extreme conditions such as very high temperature, pressure, or both in the bore of an oil well.

Various means can be used to couple the output of the quartz sensor's output to the optical fiber-based telemetry system. Such a telemetry system has all the advantages of the quartz sensors and the FBG based systems.

The frequency, not the amplitude of the RF signal from the quartz sensor is the measurement. The RF signal therefore can be amplified if necessary. It is used to produce an acoustic signal that is either coupled directly into or picked up by a FBG sensor. Since only the frequency is desired, the measurement can be made very accurately using the FBG sensor.

Figure 1:
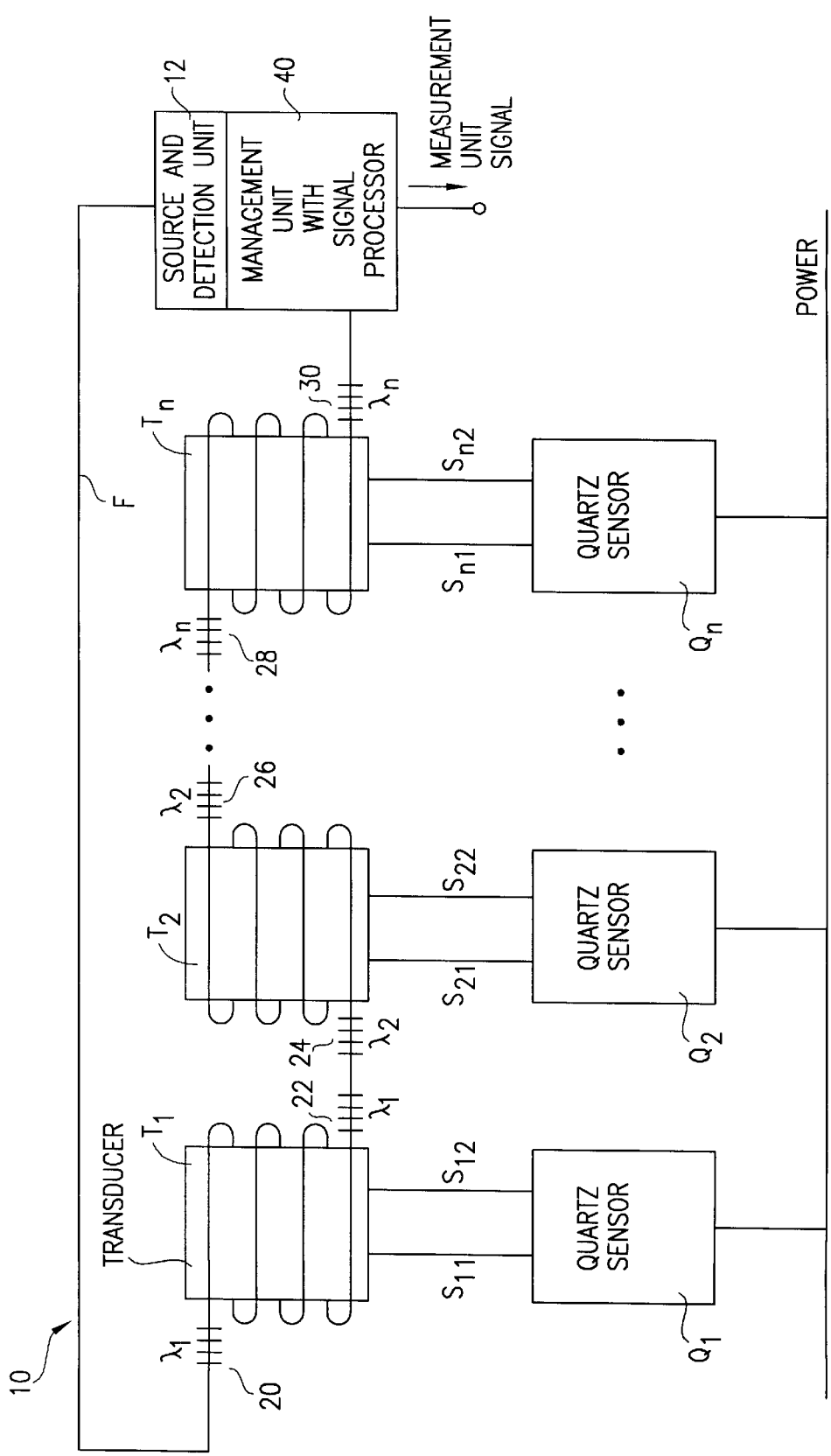
FIG. 1 is a diagram of a sensing system that is the subject matter of the present invention.
Figure 2:
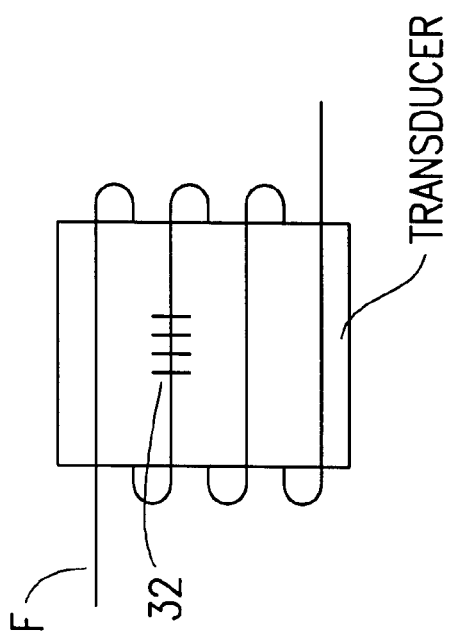
FIG. 2 is a diagram of an alternative embodiment of a part of the sensing system shown in FIG. 1.

The various couplings between the quartz sensor and the optical fiber shown and described below are an important feature of the present invention. In FIG. 1, the quartz sensor is shown directly coupled to the transducer and an RF signal (after being amplified if necessary) is used to drive the transducer on which part of the fiber is wound. The cavity FBG sensor is shown in FIG. 1. The fiber Bragg Gratings can also be placed directly on the fiber section on the transducer and the wavelength shift is measured as shown in FIG. 2.

Figure 4:
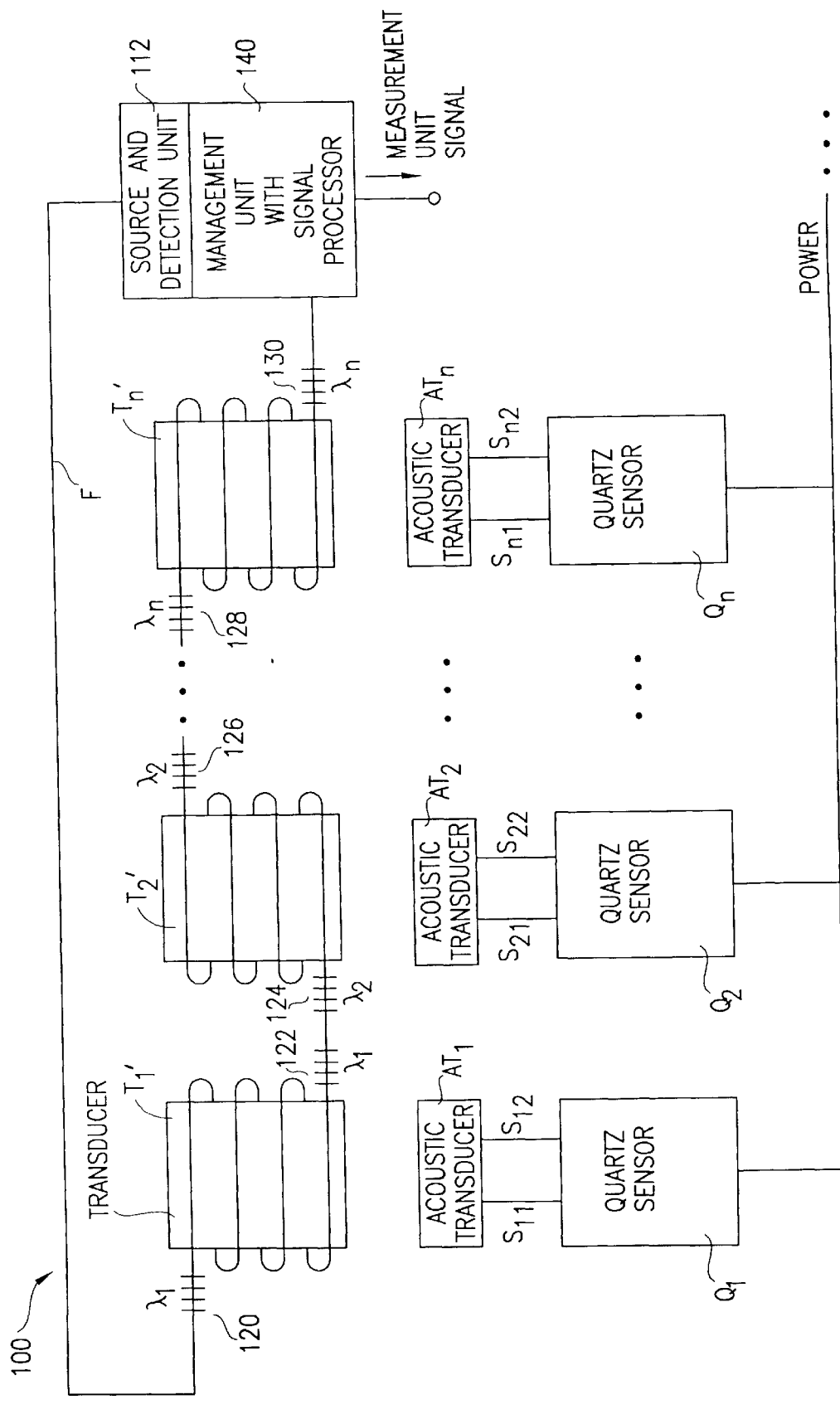
FIG. 4 is a diagram of another embodiment of the present invention.

In FIG. 4, the quartz sensor is shown indirectly coupled to the transducer and optical fiber by an acoustic transducer. The acoustic signal is picked up by the transducer, which changes the length of the optical fiber wrapped thereon. Again, various types of FBG sensors can be used.

The Sensing System Shown in FIG. 1

FIG. 1 shows a sensing system generally indicated as 10 having quartz sensors $Q_1, Q_2, \ldots, Q_n$, transducers $T_1, T_2, \ldots, T_n$, a broadband optical source 12, an optical fiber F having pairs of fiber Bragg Grating therein 20, 22; 24, 26; 28, 30 and a measurement unit 40.

The quartz sensors $Q_1, Q_2, \ldots, Q_n$ respond to a physical property such as pressure, and further respond to an electrical power signal, for providing quartz sensor electric signals $S_{11}, S_{12}; S_{21}, S_{22}; \ldots; S_{n1}, S_{n2}$ containing information about the physical property such as the pressure. In operation, the quartz frequency is directly related to the pressure measurement. The scope of the invention is not intended to be limited to any particular kind of physical property sensed. The quartz sensors $Q_1, Q_2, \ldots, Q_n$ are known in the art, and the scope of the invention is not intended to be limited to any particular kind thereof. The scope of the invention is also not intended to be limited to only a quartz sensor. Other sensors may also be used that sense a pressure, and convert it into a sensor signal containing information about the pressure.

The transducers $T_1, T_2, \ldots, T_n$ respond to the quartz sensor electric signals $S_{11}, S_{12}; S_{21}, S_{22}; \ldots; S_{n1}, S_{n2}$, for providing electromechanical transducer forces in the form of transducer expansions and contractions containing information about the plurality of quartz sensor electrical signals. The transducers are known in the art, include both piezoelectric and magnetostrictive transducers, and are electrically passive elements. The scope of the invention is not intended to be limited to any particular kind of transducer. In operation, the transducers $T_1, T_2, \ldots, T_n$ respond to the quartz sensor electrical signals $S_{11}, S_{12}; S_{21}, S_{22}; \ldots; S_{n1}, S_{n2}$, and physically deform by expanding or contracting. Embodiments are envisioned using any transducer that responds to any electrical signal, and changes some physical parameter or characteristic like its mechanical shape that can be sensed by an optical fiber with a fiber Bragg Grating or fiber Bragg Grating pairs, or a coupler-based system.

The optical source and detection unit 12 provides an optical source signal, which may be a broadband or narrowband signal depending on the particular application, as discussed below. The optical source and detection unit 12 is known in the art; and the scope of the invention is not intended to be limited to any particular kind of optical source, or any particular broadband optical source signal.

The optical fiber F has fiber Bragg Grating pairs 20, 22; 24, 26; 28, 30 each with a respective wavelength $\lambda_1, \lambda_2, \ldots, \lambda_n$. The optical fiber F responds to the electromechanical force of the transducers $T_1, T_2, \ldots, T_n$, changes the phase of the optical signal depending on the change in length of the optical fiber, and provides pairs of fiber Bragg Grating optical signals containing multiplexed optical information about the electromechanical forces of the transducer $T_1, T_2, \ldots, T_n$. The optical fiber F is separately wrapped around each of the transducers $T_1, T_2, \ldots, T_n$ and affixed thereon. The optical fiber F may be affixed to the transducers $T_1, T_2, \ldots, T_n$ by bonding or by wrapping under tension. The bonding technique is known in the art, and the scope of the invention is not intended to be limited to any particular type thereof. The scope of the invention is not intended to be limited to any particular way of affixing the optical fiber to the the transducers $T_1, T_2, \ldots, T_n$. Each fiber Bragg Grating pair 20, 22; 24, 26; 28, 30 is arranged on a part of the optical fiber F not bonded to the transducers $T_1, T_2, \ldots, T_n$, and the transducers $T_1, T_2, \ldots, T_n$, are arranged between each fiber Bragg Grating pair 20, 22; 24, 26; 28, 30.

The measurement unit 40 responds to the fiber Bragg Grating optical signals, which is received by the detection unit 12, for providing a measurement unit signal containing information about the pressure. The measurement unit 40 is known in the art, and may include a typical microprocessor based architecture, including a microprocessor, a Random Access Memory (RAM), a Read Only Memory (ROM), input/output devices, and a bus for providing data and control signals between these elements. The scope of the invention is not intended to be limited to any particular hardware and software design of the measurement unit 40, and must perform the signal processing analysis, as discussed below.

The Alternative Embodiment Shown in FIG. 2

FIG. 2 shows a part of an alternative embodiment wherein a single fiber Bragg Grating 32 is separately arranged on a part of the optical fiber F bonded to each transducer T. The bonded fiber Bragg Grating 32 may be used instead of the unbonded fiber Bragg Grating pairs 20, 22; 24, 26; 28, 30.

The Fiber Bragg Gratings

The present invention uses fiber Bragg Gratings 20, 22, 24, 26, 28, 30, 32 as optical converters or sensors, and are well known in the art. The scope of the invention is not intended to be limited to any particular kind or type thereof. It should be understood that any suitable fiber Bragg Grating sensor configuration may be used. For example, the fiber Bragg Gratings can be used for interferometric detection. Alternatively, the fiber Bragg Gratings may be used to form lasing elements for detection, for example by positioning an Ebrium doped length of optical fiber between a pair of fiber Bragg Gratings. It will also be understood by those skilled in the art that the present invention will work equally as well with other types of sensors.

As will be further understood by those skilled in the art, the optical signal processing equipment may operate on a principle of wave-division multiplexing (WDM) as described above wherein each fiber Bragg Grating sensor is utilized at a different wavelength or frequency band of interest. In such WDM embodiments, the fiber Bragg Grating pairs all have different wavelengths, and a broadband light source and detection unit is typically used. Alternatively, the present invention may utilize time-division multiplexing (TDM) for obtaining signals of the same wavelength from multiple independent sensors using time of flight analysis, or any other suitable means for analyzing signals returned from a plurality of fiber Bragg Grating sensors formed in a fiber optic sensor string. In such TDM embodiments, the fiber Bragg Grating pairs have the same wavelengths, and a narrowband light source and detection unit is typically used. Embodiments are also envisioned using time-division multiplexing (TDM) in combination with wave division multiplexing (WDM), wherein some fiber Bragg Grating pairs have the same wavelengths, and some fiber Bragg Grating pairs have different wavelengths.

Moreover, the scope of the invention is also not intended to be limited to only a fiber Bragg Grating. Embodiments are envisioned using other fiber gratings that respond to optical signals, and change some optical parameter or characteristic thereof that can be subsequently sensed and/or detected.

Signal Processing Analysis

A person skilled in the art would appreciate how the optic fiber Bragg Grating sensors are used as sensor elements. The reader is generally referred to U.S. patent Ser. Nos. 08/853,762; 08/853,535; and U.S. patent application Ser. No. 08/853,402, all filed May 9, 1997, as well as U.S. patent application Ser. No. 09/016,258, filed Jan. 30, 1998, all assigned to the assignee of the present application, and hereby incorporated by reference. The scope of the invention is not intended to be limited to any particular optical signal processing technique.

As described therein, a data acquisition unit has a broadband light source or laser diode with suitable photo optic couplers. Demodulators and filtering equipment can be used to monitor the Bragg Grating wavelength shift as the grating is subjected to strain. If more than one grating is used, wave division multiplexing techniques can be utilized to discriminate the value or change in wavelength of each individual Bragg Grating.

When such a fiber grating is illuminated, it reflects a narrow band of light at a specified wavelength. However, a measurand, such as strain induced by pressure or temperature, will induce a change in the fiber grating spacing, which changes the wavelength of the light it reflects. The value (magnitude) of the measurand is directly related to the wavelength reflected by the fiber grating and can be determined by detecting the wavelength of the reflected light.

Other optical signal analysis techniques may be used with the present invention such as the necessary hardware and software to implement the optical signal diagnostic equipment disclosed in U.S. Pat. Nos. 4,996,419; 5,361,130; 5,401,956; 5,426,297; and/or 5,493,390, all of which are hereby incorporated by reference.

As is well known in the art, there are various optical signal analysis approaches which may be utilized to analyze return signals from Bragg Gratings. These approaches may be generally classified in the following four categories:

1. Direct spectroscopy utilizing conventional dispersive elements such as line gratings, prisms, etc., and a linear array of photo detector elements or a CCD array.
2. Passive optical filtering using both optics or a fiber device with wavelength-dependent transfer function, such as a WDM coupler.
3. Tracking using a tuneable filter such as, for example, a scanning Fabry-Perot filter, an acousto-optic filter such as the filter described in the above referenced U.S. Pat. No. 5,493,390, or fiber Bragg Grating based filters.
4. Interferometry utilizing well known grating-based or coupler-based scheme using fiber Bragg Grating or coupler pairs for detecting a change in phase as a function of a change in length of the optical fiber.

The particular technique utilized will vary, and may depend on the Bragg Grating wavelength shift magnitude (which depends on the sensor design) and the frequency range of the measurand to be detected. The reader is generally referred to FIGS. 4–8 of U.S. patent application Ser. No. 09/016,258, discussed above, which would be appreciated by a person skilled in the art.

Embodiments are also envisioned using time division multiplexing in which the same wavelength $\lambda_1$ is reflected from different fiber Bragg Grating pairs spaced at different locations. The reflected optical signal is processed using known time division multiplexing signal processing techniques.

Coupler-based Interferometer Sensing System

Figure 3:
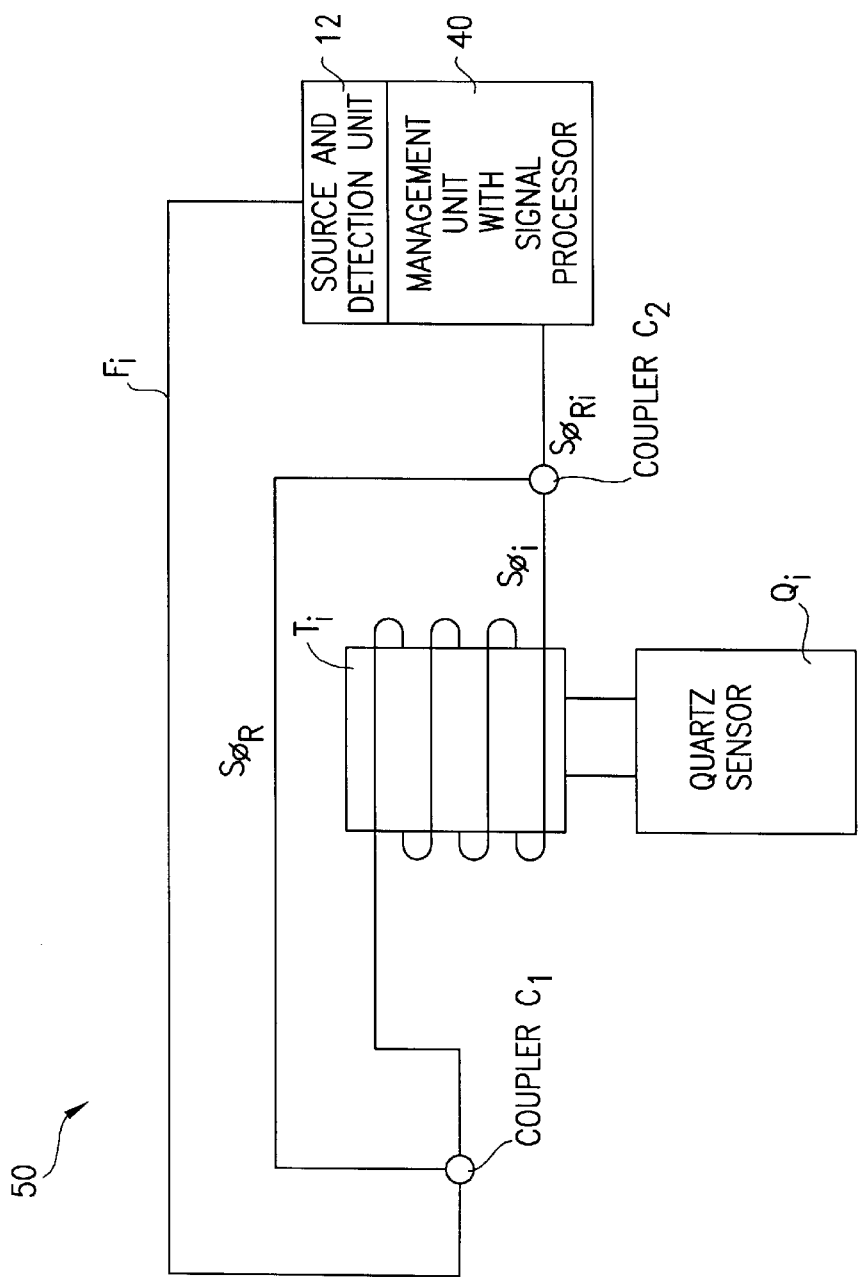
FIG. 3 is a diagram of an alternative sensing system using a coupler-based interferometer technique.

FIG. 3 shows a coupler-based interferometer sensing system generally indicated as 50. There are many different coupler-based interferometer systems known in the art, and the description of the embodiment shown in FIG. 3 is provided by way of example only. The scope of the sensing system of the present invention is not intended to be limited to any particular kind of coupler-based interferometer system.

In FIG. 3, the coupler-based interferometer sensing system 50 includes an optical source and detection unit 12, a fiber $F_i$, a coupler $C_1$, a transducer $T_i$, a quartz sensor $Q_i$, a coupler $C_2$ and a measurement unit 140. In this embodiment fiber Bragg Gratings are not used. Instead, the optical source and detection unit 12 provides an optical signal on the optical fiber $F_i$ to the coupler $C_1$, which splits the optical signal into two optical signals, one of which is labelled $S\phi_R$ having a reference phase $\phi_R$. The quartz sensor $Q_i$ responds to a pressure, for providing a quartz sensor signal containing information about the pressure. The transducer $T_i$ responds to the quartz sensor signal, for providing a transducer force containing information about the quartz sensor signal. The optical fiber $F_i$ wrapped around the transducer $T_i$ responds to the transducer force, changes the phase of the other optical signal depending on the change in length of the fiber $F_i$, for providing a transduced optical signal $S\phi_i$ having a transduced phase $\phi_i$ containing information about the transducer force. The coupler $C_2$ combines the optical signal $S\phi_R$ having the reference phase $\phi_R$ and the transduced optical signal $S\phi_i$ having the transduced phase $\phi_i$, for providing a coupled optical signal $S\phi_{Ri}$. In operation, the optical signal $S\phi_R$ and the transduced optical signal $S\phi_i$ interfere with one another. The measurement unit 140 processes the coupled optical signal $S\phi_{Ri}$ using very well known interferometer signal processing techniques, which are described in one or more of the patents incorporated by reference herein. FIG. 3 shows the coupler-based interferometer sensing system 50 having one combination of a fiber $F_i$, a coupler $C_1$, a transducer $T_i$, quartz sensor $G_i$, a coupler $C_2$; however, other embodiments are also known in the art.

Alternative Embodiment

FIG. 4 shows an alternative embodiment of the sensing system of the present invention generally indicated as 100. In the sensing system 100, the electromechanical converter includes acoustic transducers $AT_1, AT_2, \ldots, AT_n$ in combination with transducers $T_1', T_2', \ldots, T_n'$. The acoustic transducer $AT_1, AT_2, \ldots, AT_n$ respond to the quartz sensor signal, for providing acoustic transducer waves containing information about the quartz sensor signal. The transducers $T_1', T_2', \ldots, T_n'$ respond to the acoustic transducer wave, for providing mechanical transducer forces containing information about the acoustic transducer wave. The transducers $T_1', T_2', \ldots, T_n'$ are known in the art, and may include mandrel transducers as shown in FIG. 4, as well as piggy backed piezoelectric or magnetostrictive transducers. The piggy backed piezoelectric or magnetostrictive transducer would include a first piezoelectric or magnetostrictive transducer and a second piezoelectric or magnetostrictive transducer having the fiber wrapped around and bonded thereto similar to that shown in FIG. 1 or 2. The first piezoelectric or magnetostrictive transducer senses the acoustic wave, deforms, and provides an electromechanical signal containing information about the acoustic wave. The second piezoelectric or magnetostrictive transducer responds to the electromechanical signal from the first piezoelectric or magnetostrictive transducer, changes an optical parameter or characteristic of the optical source signal depending on the change in length of the optical fiber and provides a transduced optical signal containing information about the electromechanical force from the first piezoelectric or magnetostrictive transducer, similar to that shown and described in FIGS. 1 and 2.

Similar to that discussed above, each fiber Bragg Grating pair 120, 122; 124, 126; 128, 130 is arranged on a part of the optical fiber F not bonded to the transducers $T_1, T_2, \ldots, T_n$, and operates in a manner similar to that shown and described above with respect to FIG. 1.

Issues Related to Cross Talk

A FBG sensor will pick up acoustic signals from other sensors in the system shown in FIG. 4. If the sensors are far apart so that the signals from other sensors are much smaller than the desired signal, the cross talk is not a problem. The frequency of the highest-level signal read by a FBG sensor corresponds to the pressure at that location. Since the sensors are far apart, identifying which signal is the strongest, is very easy.

In a system with sensors densely distributed, all the acoustic transducers must be carefully calibrated.

The cross talk is effectively eliminated if some acoustic insulation is used around the transducers in the embodiment shown in FIG. 1.

Weighted Signal Processing Technique

Weighted signal processing techniques are possible using the sensing system of the present invention. For example, the signals from the quartz sensors $Q_1, Q_2, \ldots, Q_n$ may be summed with the following equation:

$$S = w(Q_1) * s_1 + w(Q_2) * s_2 + \ldots + w(Q_n) * s_n,$$

where $w(Q_i)$ is a weighting function for a quartz sensor $Q_i$, and $s_i$ is the electrical voltage signal from a geophone $G_i$. The weighting function can be used to determine the directivity as well as other important characteristics of a particular pressure.

Figure 5:
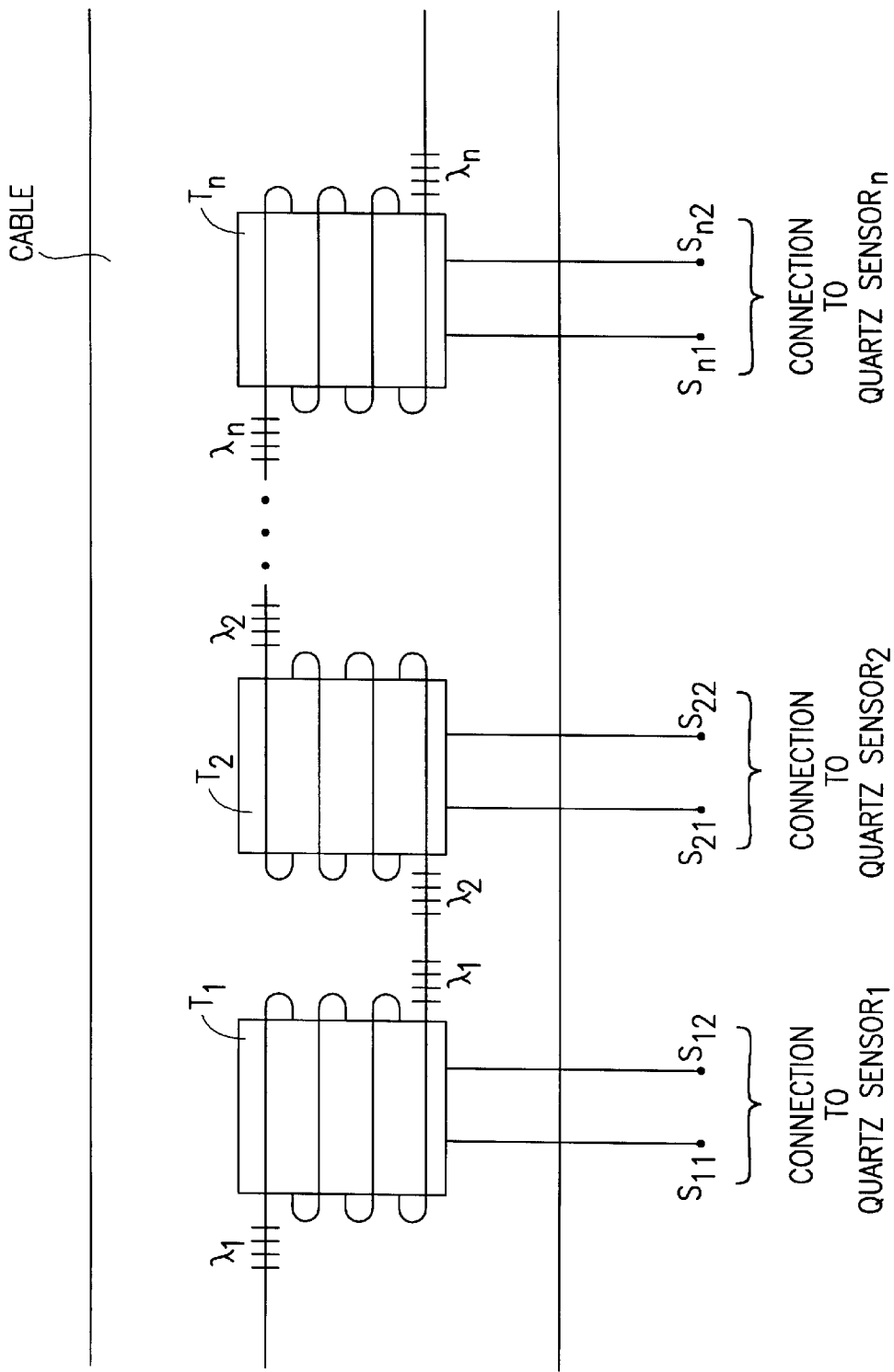
FIG. 5 is a diagram of a cable housing for the sensing system shown in FIG. 1.

FIG. 5—A Cable Housing Arrangement

FIG. 5 shows a cable for housing the quartz sensor connections, the transducers, and the optical fiber to permit a much simpler deployment of the sensing system of the present invention. The transducers $T_1, T_2, \ldots, T_n$ may be oriented in any particular way in the cable, and the scope of the invention is not intended to be limited to any particular orientation.

Figure 6:
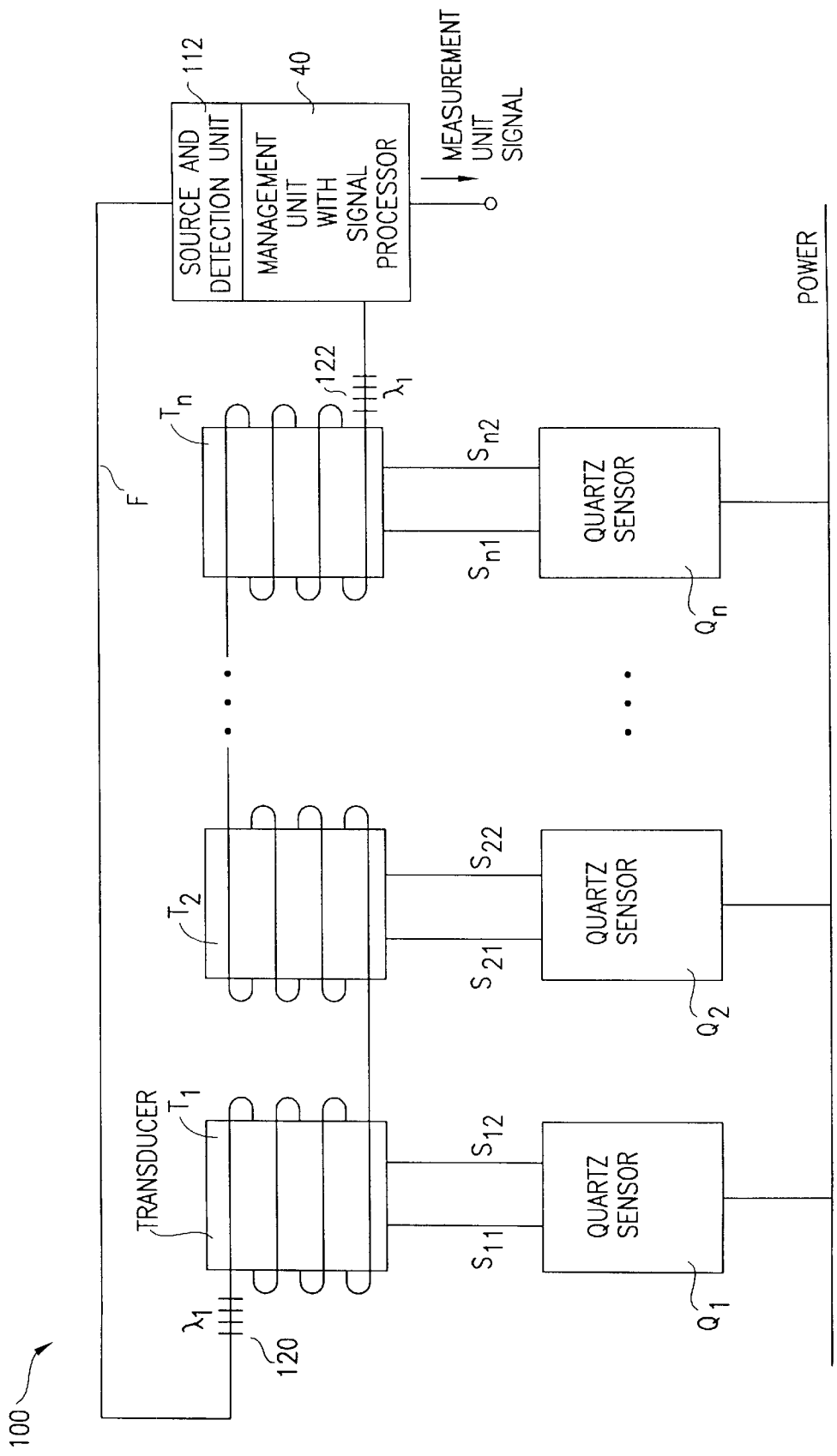
FIG. 6 is a diagram of another embodiment having a serial transducer arrangement.

FIG. 6—Series Arrangement of Transducers

FIG. 6 shows a sensing system generally indicated as 100. The parts in FIG. 6 that are similar to the parts in FIG. 1 are similarly labelled and not described with respect to FIG. 6. The sensing system 100 has a series arrangement of transducers $T_1, T_2, \ldots, T_n$ with one fiber Bragg Grating pair 120, 122 at each end thereof having the same wavelength $\lambda_1$. In operation, expansion and contraction of the transducers $T_1$, $T_2, \ldots, T_n$ combine to change the length of the optical fiber, which in turn changes the phase of the optical signal.

Scope of the Invention

Although the invention has been described and illustrated with respect to exemplary embodiments thereof, the foregoing and various other additions and omissions may be made therein and thereto without departing from the spirit and scope of the present invention.

We claim:

1. A pressure sensing system, comprising:
a quartz sensor having an input and two outputs, responsive to pressure, and further responsive to an electrical power signal received in the input, for sensing the pressure free of temperature effect over time, and providing from the two outputs quartz sensor electrical signals containing information about the pressure;
a transducer having two inputs, responsive to the quartz sensor electrical signals received in the two inputs, for providing an electromechanical transducer force containing information about the quartz sensor electrical signals;
an optical source for providing an optical source signal;
an optical fiber, responsive to the electromechanical transducer force, for changing an optical parameter or characteristic of the optical source signal depending on the change in length of the optical fiber and providing a transduced optical signal containing information about the electromechanical force from the transducer; and
a measurement unit, responsive to the transduced optical signal, for providing a measurement unit signal containing information about the pressure.

2. A pressure sensing system according to claim 1, wherein the transducer is a piezoelectric or magnetostrictive transducer.

3. A pressure sensing system according to claim 2, wherein the optical fiber is wrapped around the piezoelectric or magnetostrictive transducer and affixed thereon.

4. A pressure sensing system according to claim 2, wherein the optical fiber is bonded to the piezoelectric or magnetostrictive transducer;
wherein the optical fiber has fiber Bragg Grating pairs arranged on a part thereof not bonded to the transducer; and
wherein the piezoelectric or magnetostrictive transducer is arranged between the fiber Bragg Grating pairs.

5. A pressure sensing system according to claim 2, wherein the optical fiber has one fiber Bragg Grating arranged on a part thereof bonded to the piezoelectric transducer.

6. A pressure sensing system according to claim 1, wherein the sensing system is a coupler-based interferometer sensing system.

7. A pressure sensing system according to claim 6, wherein the optical source and detection unit (12) provides an optical signal on the fiber ($F_i$);
wherein the sensing system further comprises a coupler ($C_1$) that responds to the optical signal, for providing two optical signals, one optical signal ($S\phi_R$) of which has a reference phase ($\phi_R$);
wherein the sensor is a quartz sensor ($Q_i$) that responds to the pressure, for providing the sensor signal in the form of a quartz sensor signal containing information about the pressure;
wherein the transducer $T_i$ responds to the quartz sensor signal, for providing the transducer force containing information about the quartz sensor signal;
wherein the optical fiber (F) is wrapped around the transducer ($T_i$), responds to the transducer force, changes the phase of the optical signal depending on the change in length of the fiber ($F_i$), for providing a transduced optical signal $S\phi_i$ having a transduced phase ($\phi_i$) containing information about the transducer force;
wherein the sensing system further comprises a coupler $C_2$ that combines the optical signal ($S\phi_R$) and the transduced optical signal ($S\phi_i$), for providing a coupled optical signal ($S\phi_{Ri}$); and
wherein the measurement unit (140) processes the coupled optical signal ($S\phi_{Ri}$), for providing the measurement unit signal containing information about the physical property such as the pressure.

8. A pressure sensing system according to claim 1, wherein the measurement unit performs signal processing on the transduced signal using direct spectroscopy utilizing conventional dispersive elements such as line gratings or prisms, and a linear array of photo detector elements or a CCD array.

9. A pressure sensing system according to claim 1, wherein the measurement unit performs signal processing on the transduced optical signal using passive optical filtering using both optics or a fiber device with wavelength-dependent transfer function, such as a WDM coupler.

10. A pressure sensing system according to claim 1, wherein the measurement unit performs signal processing on the transduced optical signal using tracking with a tuneable filter such as, for example, a scanning Fabry-Perot filter, an acousto-optic filter or fiber Bragg Grating based filters.

11. A pressure sensing system (10) using optical fiber, comprising:
a plurality of quartz sensors ($Q_1, Q_2, \ldots, Q_n$), each having a respective input and two respective outputs, responsive to pressure, and further responsive to an electrical power signal received in the respective input, each quartz sensor ($Q_1, Q_2, \ldots, Q_n$) sensing the pressure free of temperature effect over time, for providing from the two outputs respective quartz electric sensor signals ($S_{11}, S_{12}; S_{21}, S_{22}; \ldots; S_{n1}, S_{n2}$) containing information about the change in pressure;
a plurality of transducers ($T_1, T_2, \ldots, T_n$), having two inputs, responsive to the respective quartz electric sensor signals ($S_{11}, S_{12}; S_{21}, S_{22}; \ldots; S_{n1}, S_{n2}$) received in the two inputs, for providing a plurality of electromechanical transducer forces containing information about the plurality of quartz electric sensor signals;
a broadband optical source (12) for providing a broadband optical source signal;
an optical fiber (F) having fiber Bragg Grating pairs therein (20, 22; 24, 26; 28, 30) each with a respective wavelength ($\lambda_1, \lambda_2, \ldots, \lambda_n$), responsive to the plurality of electromechanical transducer forces, for changing an optical parameter or characteristic of the broadband optical source signal depending on the change in length of the optical fiber and providing a plurality of fiber Bragg Grating optical signals containing multiplexed information about the plurality of electromechanical transducer forces; and
a measurement unit (40), responsive to the plurality of fiber Bragg Grating optical signals, for providing a measurement unit signal containing information about the change in pressure.

12. A sensing system according to claim 11,
wherein the plurality of transducers include one or more piezoelectric or magnetostrictive transducers.

13. A sensing system according to claim 12,
wherein the optical fiber is separately wrapped around each of the plurality of piezoelectric or magnetostrictive transducers and bonded thereon.

14. A sensing system according to claim 12,
wherein the fiber Bragg Grating pairs are arranged on a part of the optical fiber not bonded to each of the plurality of transducers; and
wherein each of the plurality of piezoelectric transducer is arranged between the fiber Bragg Grating pairs.

15. A sensing system according to claim 12,
wherein the at least one fiber Bragg Grating includes a respective fiber Bragg Grating separately arranged on a part of the optical fiber bonded to each of the plurality of transducers.

16. A sensing system according to claim 11, wherein the measurement unit performs signal processing on the transduced signal using one of the following methods:
direct spectroscopy utilizing conventional dispersive elements such as line gratings or prisms, and a linear array of photo detector elements or a CCD array, or
passive optical filtering using both optics or a fiber device with wavelength-dependent transfer function, such as a WDM coupler, or
tracking with a tuneable filter such as, for example, a scanning Fabry-Perot filter, an acousto-optic filter or fiber Bragg Grating based filters.

17. A pressure sensing system, comprising:
a quartz sensor, responsive to pressure, and further responsive to an electrical power signal, each quartz sensor sensing the pressure free of temperature effect over time, for providing an electrical quartz sensor signal containing information about the pressure;
an acoustic transducer, responsive to the quartz sensor signal, for providing an acoustic wave containing information about the quartz sensor signal;
an optical source for providing an optical source signal;
an optical fiber, responsive to the acoustic wave, for changing an optical parameter or characteristic of the optical source signal depending on the change in length of the optical fiber and providing a transduced optical signal containing information about the acoustic wave from the acoustic transducer; and
a measurement unit, responsive to the transduced optical signal, for providing a measurement unit signal containing information about the pressure.

18. A pressure sensing system, comprising:
a quartz sensor having an input and two outputs, responsive to a pressure, and further responsive to an electrical power signal received in the input, each quartz sensor sensing the pressure free of temperature effect over time, for providing from the two outputs quartz sensor electrical signals containing information about the pressure;
electromechanical converter means having two inputs, responsive to the electrical quartz sensor signals received in the two inputs, for providing a mechanical converter force containing information about the sensed voltage or current signal;
an optical source for providing an optical source signal;
an optical fiber, responsive to the mechanical converter force, for changing an optical parameter or characteristic of the optical source signal depending on the change in length of the optical fiber and providing an electromechanical converter optical signal containing information about the mechanical converter force; and
signal processor means, responsive to the electromechanical converter optical signal, for providing a signal processor signal containing information about the pressure.

19. A pressure sensing system according to claim 18,
wherein the electromechanical converter means includes a piezoelectric or magnetostrictive transducer that responds to the quartz sensor signal, for providing an piezoelectric or magnetostrictive transducer force containing information about the quartz sensor signal.

20. A pressure sensing system according to claim 18,
wherein the electromechanical converter means includes an acoustic transducer that responds to the quartz sensor signal, for providing an acoustic transducer wave containing information about the quartz sensor signal;
wherein the electromechanical converter means includes a piezoelectric or magnetostrictive transducer that responds to the acoustic transducer wave, for providing an piezoelectric or magnetostrictive transducer force containing information about the acoustic transducer wave.

21. A pressure sensing system according to claim 19, wherein the measurement unit performs signal processing on the transduced signal using one of the following methods:
direct spectroscopy utilizing conventional dispersive elements such as line gratings or prisms, and a linear array of photo detector elements or a CCD array; or
passive optical filtering using both optics or a fiber device with wavelength-dependent transfer function, such as a WDM coupler; or
tracking with a tuneable filter such as, for example, a scanning Fabry-Perot filter, an acousto-optic filter or fiber Bragg Grating based filters; or interferometry utilizing a grating-based or coupler-based scheme processing signals from fiber Bragg Grating or coupler pairs for detecting a change in phase as a function of a change in length of the optical fiber.

22. A pressure sensing system according to claim 18,
wherein the change in length of the optical fiber causes a change in the phase or wavelength of the optical source signal being transmitted or reflected through the optical fiber.

23. A pressure sensing system according to claim 18,
wherein sensing system further comprises a cable for housing the plurality of quartz connections, the plurality of transducers and the optical fiber.

24. A pressure seismic sensing system according to claim 3,
wherein the optical fiber is wrapped under tension on the piezoelectric or magnetostrictive transducer.

25. A pressure seismic sensing system according to claim 3,
wherein the optical fiber is bonded to the piezoelectric or magnetostrictive transducer.

* * * * *

UNITED STATES PATENT AND TRADEMARK OFFICE
CERTIFICATE OF CORRECTION

PATENT NO. : 6,305,227 B1
DATED : October 23, 2001
INVENTOR(S) : Jian-Qun Wu et al.

It is certified that error appears in the above-identified patent and that said Letters Patent is hereby corrected as shown below:

Column 2,
Line 10, please delete "tranmitters" and insert -- transmitters --.
Line 11, please delete "acoutic" and insert -- acoustic --.

Column 5,
Line 5, please delete the first -- the --.

Column 7,
Line 20, please insert a comma after -- $F_i$ --.

Column 10,
Line 56, please delete "$X_n$" and insert -- $\lambda_n$ --.

Signed and Sealed this

Ninth Day of April, 2002

Attest:

Attesting Officer

JAMES E. ROGAN
Director of the United States Patent and Trademark Office